(No Model.)
O. GILMORE, Dec'd.
C. GILMORE, Administrator.
CHANNEL FLAP LAYING MACHINE.
No. 364,757. Patented June 14, 1887.
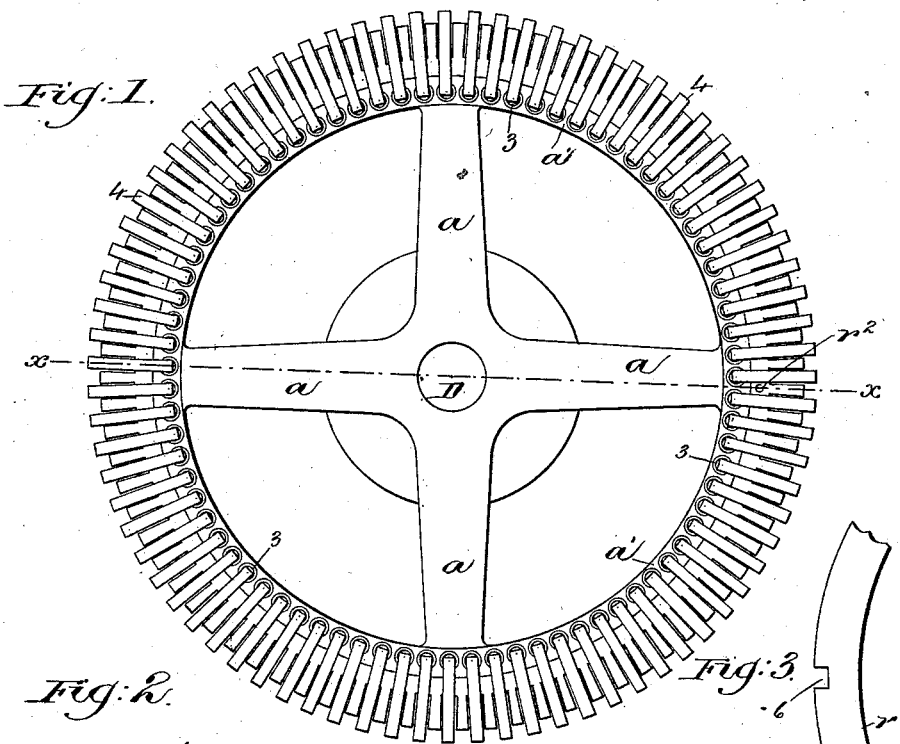
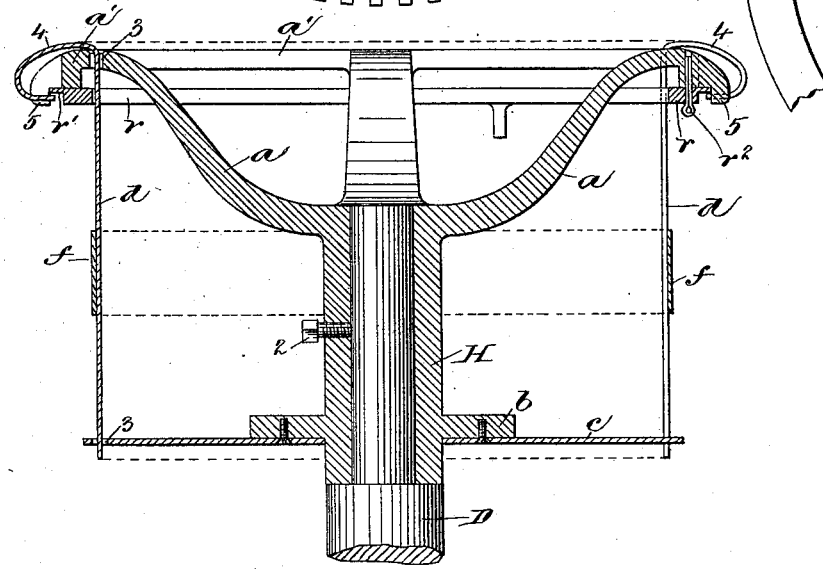
Witnesses
Fred L. Emery.
John F. C. Reinhart.
Inventor.
Othniel Gilmore
by Cassander Gilmore
by Hornby Gregory attys

UNITED STATES PATENT OFFICE.

CASSANDER GILMORE, OF NORTH RAYNHAM, MASSACHUSETTS, ADMINISTRATOR OF OTHNIEL GILMORE, DECEASED.

CHANNEL-FLAP-LAYING MACHINE.

SPECIFICATION forming part of Letters Patent No. 364,757, dated June 14, 1887.

Application filed February 25, 1887. Serial No. 228,521. (No model.)

*To all whom it may concern:*

Be it known that, OTHNIEL GILMORE, late of North Raynham, county of Bristol, and State of Massachusetts, deceased, did invent an Improvement in Channel-Flap-Laying Machines, of which the following description, in connection with the accompanying drawings, is a specification, like letters on the drawings representing like parts.

This invention is an improvement upon the channel-flap-laying machine described in United States Patent No. 310,668, granted to Othniel Gilmore January 13, 1885, and has for its object to improve the construction of the same that a more durable and better operating-machine may be provided.

In accordance with this invention the acting-surface of the wiper to act upon the bottom of the sole and the shank of the boot or shoe consists, essentially, of a series of bars carried by a skeleton frame or head, each bar having a curved yielding bearing-face.

A suitable fastening device is employed for securing the bars to the head, such fastening device being so arranged that any desired one of the bars may be removed or replaced when broken or injured in any manner, to thereby avoid the necessity of providing an entirely new wiper or of removing all the bars in case of accident.

Figure 1 shows a face view of the wiper and its carrying frame or head; Fig. 2, a vertical section in line $x$ of the head shown in Fig. 1; and Fig. 3, a detail of a portion of the fastening device, to be herein described.

The shaft D, supported in any suitable bearings and driven by any suitable means—such, for instance, as shown in the patent referred to—has fixed to it, as by a set-screw, 2, a skeleton frame or head, H, composed of a tubular shank portion and several arms, $a$, extending outward from the forward end of the shank portion, said arms supporting a ring, $a'$, cast integral with or attached to the said arms. The tubular portion of the head at that end opposite the arms $a$ is provided with a flange, $b$, to which is secured a circular plate, $c$. The ring $a'$ and the plate $c$ are provided each with a series of holes, 3, which register with each other, and which receive a series of bars, $d$, which together constitute the wiping-surface, the holes being made of sufficient size to allow the said bars to move to a limited extent thereon. The end of each bar $d$, adjacent to the ring $a'$, is curved or bent outwardly or radially from the head, as at 4; and, as shown, the end of each bar is turned inwardly, as at 5, and enters a notch in the said ring.

A suitable ring, $r$, resting against the rear side of the supporting-ring $a'$, has a flange, $r'$, against which the inturned end 5 of each bar $d$ bears, the said ring securing the said bars in position against longitudinal motion.

The ring $r$ is provided at some point of its periphery with a notch, 6, (see detail, Fig. 3,) so that when the ring is moved to bring the said notch in line with the inturned end 5 of one of the bars it permits the said bar to be removed; and so, also, in that position a bar may be applied by permitting the inturned end 5 to pass through the notch 6. The ring $r$ may be locked in such position by a pin, $r^2$, passed through a hole in the ring $r$, and entering a hole bored in the supporting-ring $a'$, as to place the notch 6 out of the line of movement of the bars next to it. Should one of the bars be broken, bent, or injured in any manner—or, if for any other cause it should be desired to remove or replace one of the bars—the pin $r^2$ will be withdrawn to permit the ring $r$ to be rotated to bring the notch 6 in line with the inturned end 5 of that bar which is to be removed, thereby allowing the bar to pass. An elastic band, $f$, surrounding the several bars, tends to draw them continually toward the center of the head H.

The bent or curved portion 4 of each bar $d$ is of much larger size than the supporting-ring $a'$; and, as the said bar is made of thin metal, such curved portion 4 readily yields when brought to bear upon the channel-flap of the boot or shoe, which it is desired to lay down or replace.

By the construction herein described it will be seen, should one of the bars of the wiping-surface become injured, that it may be readily removed and a new bar be substituted for it; but should any portion of the wiping-surface described in the said patent be injured the entire surface has to be removed, which entails very considerable expense and delay.

What is claimed is—

1. The rotating frame or head, combined with a series of independent bars, $d$, having curved bearing-faces 4, extending radially from the head, substantially as described.

2. In a channel-flap-laying machine, the rotating frame or head and the bars carried thereby, combined with means for fastening the bars to the head, whereby they may be removed independently of each other, substantially as described.

3. In a channel-flap-laying machine, the rotating frame or head, the bars having each a yielding curved bearing-face, and an inturned end, 5, combined with a locking-ring, $r$, against which the inturned ends 5 bear, said locking-ring having a notch, 6, substantially as described.

4. In a channel-flap-laying machine, the rotating frame or head, the bars having yielding bearing-faces and inturned ends 5, combined with the locking-ring $r$, against which the inturned ends 5 bear, said locking-ring having a notch, 6, a pin, $r^2$, for locking the ring and the elastic band for drawing the bars toward the center of the head, substantially as described.

5. In a channel-flap-laying machine, the rotating frame or head having the supporting-ring $a'$ and the circular plate $c$, each provided with a series of holes adapted to register with each other, combined with a series of bars loosely fitting the holes and a locking device for the bars, whereby any desired one of the said bars may be removed, substantially as described.

In testimony whereof I have signed my name to this specification in the presence of two subscribing witnesses.

CASSANDER GILMORE,
*Administrator of the Estate of Othniel Gilmore.*

Witnesses:
BERNICE J. NOYES,
F. L. EMERY.